United States Patent
Brunsman et al.

(10) Patent No.: US 11,847,176 B1
(45) Date of Patent: Dec. 19, 2023

(54) GENERATING CONTEXT-BASED SPELL CORRECTIONS OF ENTITY NAMES

(71) Applicant: Google LLC, Mountain View, CA (US)

(72) Inventors: Lawrence J. Brunsman, Mountain View, CA (US); Matthieu Devin, Los Altos Hills, CA (US); Uri N. Lerner, Los Altos, CA (US); Simon Tong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 325 days.

(21) Appl. No.: 16/227,086

(22) Filed: Dec. 20, 2018

Related U.S. Application Data

(63) Continuation of application No. 14/616,915, filed on Feb. 9, 2015, now Pat. No. 10,162,895, which is a continuation of application No. 13/071,392, filed on Mar. 24, 2011, now Pat. No. 9,002,866.

(60) Provisional application No. 61/317,622, filed on Mar. 25, 2010.

(51) Int. Cl.
*G06F 16/951* (2019.01)
*G06F 16/33* (2019.01)
*G06F 16/24* (2019.01)
*G06F 40/232* (2020.01)
*G06F 40/295* (2020.01)
*G06F 40/247* (2020.01)

(52) U.S. Cl.
CPC ............ *G06F 16/951* (2019.01); *G06F 16/24* (2019.01); *G06F 16/3338* (2019.01); *G06F 40/232* (2020.01); *G06F 40/295* (2020.01); *G06F 40/247* (2020.01)

(58) Field of Classification Search
CPC .... G06F 16/951; G06F 40/232; G06F 40/295; G06F 16/24; G06F 16/3338; G06F 40/247
See application file for complete search history.

(56) References Cited

U.S. PATENT DOCUMENTS

| | | |
|---|---|---|
| 5,542,090 A | 7/1996 | Henderson et al. |
| 6,144,958 A | 11/2000 | Ortega et al. |
| 6,167,397 A | 12/2000 | Jaconbson |

(Continued)

OTHER PUBLICATIONS

Notice of Allowance issued in U.S. Appl. No. 13/071,378 dated Sep. 19, 2012, 9 pages.

(Continued)

*Primary Examiner* — Cheyne D Ly
(74) *Attorney, Agent, or Firm* — Gray Ice Higdon

(57) ABSTRACT

Methods, systems, and apparatus, including computer programs encoded on computer storage media, for correcting entity names. One method includes receiving texts and deriving a plurality of name-context pairs from the texts. The method further includes calculating a context consistency measure for each name-context pair and storing context-entity name data representing the name-context pairs. Another method includes identifying an entity name and one or more context terms from a query and generating candidate names for the entity name. The method further includes determining a score for each of the candidate names, selecting a number of top scoring candidate names, and using the selected candidate names to respond to the query.

13 Claims, 6 Drawing Sheets

(56) References Cited

U.S. PATENT DOCUMENTS

| | | | |
|---|---|---|---|
| 6,236,768 B1 | 5/2001 | Rhodes et al. | |
| 6,271,840 B1* | 8/2001 | Finseth | G06F 16/951 |
| | | | 715/236 |
| 6,446,064 B1 | 9/2002 | Livowsky | |
| 6,601,059 B1* | 7/2003 | Fries | G06F 16/3322 |
| 6,742,176 B1 | 5/2004 | Million | |
| 7,231,393 B1 | 6/2007 | Harik et al. | |
| 7,296,019 B1 | 11/2007 | Chandrasekar et al. | |
| 7,383,258 B2 | 6/2008 | Harik et al. | |
| 7,603,349 B1* | 10/2009 | Kraft | G06Q 10/10 |
| 7,818,332 B2 | 10/2010 | Olds et al. | |
| 7,958,115 B2* | 6/2011 | Kraft | G06Q 10/10 |
| | | | 707/723 |
| 8,180,760 B1 | 5/2012 | Carver et al. | |
| 8,296,257 B1 | 10/2012 | Chavira et al. | |
| 8,392,396 B1 | 3/2013 | Carver et al. | |
| 8,402,032 B1 | 3/2013 | Brunsman et al. | |
| 8,538,984 B1* | 9/2013 | Mahabal | G06F 16/2453 |
| | | | 707/769 |
| 9,002,866 B1 | 4/2015 | Brunsman et al. | |
| 10,162,895 B1 | 12/2018 | Brunsman et al. | |
| 2002/0059219 A1 | 5/2002 | Neveitt | |
| 2004/0236725 A1* | 11/2004 | Amitay | G06F 16/3338 |
| 2005/0033641 A1* | 2/2005 | Jha | G06Q 30/02 |
| | | | 705/14.53 |
| 2005/0210017 A1 | 9/2005 | Cucerzan | |
| 2006/0026204 A1 | 2/2006 | Campbell | |
| 2006/0047636 A1* | 3/2006 | Mohania | G06F 16/20 |
| 2006/0200464 A1 | 9/2006 | Gideoni | |
| 2006/0206454 A1* | 9/2006 | Forstall | G06F 16/951 |
| 2006/0280309 A1 | 12/2006 | Krishnaswamy et al. | |
| 2007/0038601 A1* | 2/2007 | Guha | G06F 16/332 |
| 2007/0094234 A1 | 4/2007 | Wen | |
| 2007/0174299 A1* | 7/2007 | Kuang | H04L 67/18 |
| 2007/0185777 A1* | 8/2007 | Pyle | G06Q 30/02 |
| | | | 705/26.62 |
| 2007/0294615 A1* | 12/2007 | Sathe | G06F 16/9535 |
| | | | 707/803 |
| 2008/0046405 A1 | 2/2008 | Olds et al. | |
| 2008/0168053 A1 | 7/2008 | Garg | |
| 2008/0183672 A1* | 7/2008 | Canon | G06F 16/9577 |
| 2009/0070325 A1 | 3/2009 | Gabriel et al. | |
| 2009/0313100 A1* | 12/2009 | Ingleshwar | G06F 16/951 |
| | | | 707/E17.014 |
| 2010/0180198 A1* | 7/2010 | Iakobashvili | G06F 40/232 |
| | | | 715/257 |
| 2010/0180199 A1 | 7/2010 | Wu et al. | |
| 2010/0293179 A1 | 11/2010 | Chaudhuri et al. | |
| 2011/0035403 A1 | 2/2011 | Ismalon | |
| 2011/0106807 A1 | 5/2011 | Srihari et al. | |
| 2011/0225155 A1 | 9/2011 | Roulland et al. | |
| 2011/0282888 A1 | 11/2011 | Koperski et al. | |
| 2011/0307432 A1* | 12/2011 | Yao | G06F 16/951 |
| | | | 707/723 |

OTHER PUBLICATIONS

Notice of Allowance issued in U.S. Appl. No. 13/071,378 dated Nov. 23, 2012, 7 pages.
Office Action issued in U.S. Appl. No. 13/071,392 dated Jul. 6, 2012, 13 pages.
Office Action issued in U.S. Appl. No. 13/071,392 dated Mar. 7, 2013, 18 pages.
Office Action issued in U.S. Appl. No. 13/071,392 dated May 5, 2014, 16 pages.
Notice of Allowance issued in U.S. Appl. No. 13/071,392 dated Oct. 15, 2014, 9 pages.
Niu et al., Word Independent Context Pair Classification Model for Word Sense Disambiguation, Proceedings of the 9$^{th}$ Conference on Computational Natural Language Learning (CoNLL), pp. 33-39, Ann Arbor, Jun. 2005 (Year: 2005).
Niu et al., Weakly supervised learning for cross-document person name disambiguation supported by information extraction, ACL '04 Proceedings of the 42nd Annual Meeting on Association of Computational Linguistics, pp. 1-9. (Year: 2004).
Office Action issued in U.S. Appl. No. 14/616,915, dated Nov. 3, 2016, 12 pages.
Office Action issued in U.S. Appl. No. 14/616,915, dated Aug. 11, 2017, 11 pages.
Office Action issued in U.S. Appl. No. 14/616,915, dated Sep. 1, 2017, 12 pages.
Office Action issued in U.S. Appl. No. 14/616,915, dated Jan. 18, 2018, 11 pages.
Notice of Allowance issued in U.S. Appl. No. 14/616,915, dated Aug. 15, 2018, 7 pages.

* cited by examiner

GENERATING CONTEXT-BASED SPELL CORRECTIONS OF ENTITY NAMES

CROSS-REFERENCE TO RELATED APPLICATIONS

This application is a continuation of U.S. application Ser. No. 14/616,915, filed Feb. 9, 2015, which is a continuation of U.S. application Ser. No. 13/071,392, filed on Mar. 24, 2011, which claims the benefit of U.S. Provisional Patent Application Ser. No. 61/317,622, filed on Mar. 25, 2010, the contents of each are incorporated by reference herein in their entirety.

BACKGROUND

This specification relates to correcting misspelled entity names in user queries.

Internet search engines provide information about Internet accessible resources (e.g., Web pages, images, text documents, multimedia content) that are responsive to a user's search query and present information about the resources in a manner that is useful to the user. Internet search engines return a set of search results (e.g., as a ranked list of results) in response to a user submitted query. A search result includes, for example, a URL and a snippet of information from a corresponding resource.

Each query includes one or more terms, e.g., one or more words or phrases. Conventional search engines match the terms of a user's query to an index of resources in order to identify responsive search results. However, if a term in the query is misspelled, a search engine will have difficulty identifying responsive search results.

Some search engines correct the spelling in a user query by comparing the terms in the query to a dictionary of known terms, and correcting spellings when the spellings are close to, but do not exactly match, the dictionary terms. However, some terms used in queries do not appear in these dictionaries, and therefore, cannot be corrected using these conventional techniques. For example, entity names, especially entity names of ordinary (non-famous) entities often do not appear in dictionaries. An entity can be, for example, a person, a business, an organization, a product, a brand name, a team, a piece of art, or a music piece.

SUMMARY

In general, one innovative aspect of the subject matter described in this specification can be embodied in methods that include the actions of receiving texts from each of a plurality of text sources, wherein each text source provides a text; deriving a plurality of name-context pairs from the texts, wherein each name-context pair comprises an entity name included in the text from a text source and a context term occurring in the text from the text source; calculating a context consistency measure for each distinct name-context pair, wherein the context consistency measure for a particular name-context pair is an estimate of a probability that, if the entity name of the particular name-context pair appears in text, the context term of the particular name-context pair will also appear in the text; and storing context-entity name data, wherein the context-entity name data is searchable data that represents one or more of the distinct name-context pairs and the context consistency measurement for each name-context pair. Other embodiments of this aspect include corresponding systems, apparatus, and computer programs recorded on computer storage devices, each configured to perform the operations of the methods.

These and other embodiments can each optionally include one or more of the following features. The context-entity name data maps each context term in the name-context pairs to a list of entity names and the context consistency measure for each entity name. The text sources comprise documents. The text sources comprise query sessions. The context term of each name-context pair is identified from a window of text associated with the entity name of the name-context pair. The window of text includes a pre-determined number of terms before and after the entity name in the text from which the entity name is identified and the title of the document.

The actions further include determining a respective popularity score for each entity name in the plurality of name-context pairs; and the context-entity name data associates the entity names with the respective popularity scores. The popularity score for an entity name is related to how often the entity name appears in the texts. The popularity score is derived from a number of times the entity name appears in the texts and a total number of times any entity name in the plurality of name-context pairs appears in the texts. The popularity score is derived by dividing a number of the texts in which the entity name appears by a number of the texts from the plurality of text sources in which any entity name in the plurality of name-context pairs appears. The actions further include generating a score for each of the name-context pairs; and excluding, from the context entity name data, name-context pairs having a score that is less than a threshold. The score for a name-context pair is derived from the context consistency measure for the name-context pair and an average context consistency measure for the context and all entity names in the distinct name-context pairs. The score for a name-context pair is further derived from a number of times the entity name and the context term of the name-context pair appear in queries submitted to a search engine during a period of time. A first name-context pair is derived from texts from multiple text sources; and the operations further comprise modifying the score for the first name-context pair to reflect a similarity of the texts from which the first name-context pair was derived. The actions further include determining a fingerprint bucket for each text from which the first name context pair is derived; analyzing a distribution of the fingerprint buckets to determine that the distribution is skewed from a normal distribution; and modifying the score by discounting the score.

Each entity name has one or more parts and the context-entity name data further associates each entity name with a respective canonical form of each part of the entity name. Each entity name has one or more parts and the context-entity name data further associates one or more of the entity names with one or more related name parts for one or more parts of the entity name. The related text for the text from a text source comprises the text from the text source. Each entity name is a name of a respective person.

In general, another innovative aspect of the subject matter described in this specification can be embodied in methods that include the actions of receiving texts from each of a plurality of text sources, wherein each text source provides a text; deriving a plurality of name-context pairs from the texts, where each name-context pair comprises an entity name included in the text from a text source and a context term included in the text of the text source, wherein each entity name is one or more terms used to refer to a respective entity and each context term is a term that appears in text associated with the entity name; calculating a context consistency measure for each distinct name-context pair, wherein the context consistency measure for a particular name-context pair is an estimate of a probability that, if the entity name of the particular name-context pair appears in text, the context term of the particular name-context pair will also appear in the text; and storing context-entity name data, wherein the context-entity name data is searchable data that represents each distinct name-context pair and the context consistency measure for the pair. Other embodiments of this aspect include corresponding systems, apparatus, and computer programs recorded on computer storage devices, each configured to perform the operations of the methods.

These and other embodiments can each optionally include one or more of the following features. The context-entity name data maps each context term in the name-context pairs to a list of entity names and the context consistency measure for each entity name. The text associated with the entity name of each name-context pair is a window of text associated with the entity name of the name-context pair. The window of text includes a specified number of terms before and after the entity name in the text from which the entity name is identified and the title of the document.

The actions further include determining a respective popularity score for each entity name in the plurality of name-context pairs; and the context-entity name data associates the entity names with the respective popularity scores. The popularity score for an entity name is related to how often the entity name appears in the texts. The actions further include generating a score for each of the name-context pairs; and excluding, from the context entity name data, name-context pairs having a score that is less than a threshold. The score for a name-context pair is derived from the context consistency measure for the name-context pair and an average context consistency measure for the context and all entity names in the distinct name-context pairs. The score for a name-context pair is further derived from a number of times the entity name and the context term of the name-context pair appear in queries submitted to a search engine during a period of time. Each entity name is a name of a respective person. Each entity name is a name of a respective business.

In general, another innovative aspect of the subject matter described in this specification can be embodied in methods that include the actions of receiving a query; identifying an entity name and one or more context terms from the query; generating a plurality of candidate names for the entity name, wherein each candidate name is an alternative version of the entity name; determining a score for each of the candidate names, wherein the score for each candidate name is derived from a frequency with which the one or more context terms appear in text with the candidate name; selecting one or more top scoring candidate names; and using the selected one or more candidate names to generate a response to the query. Other embodiments of this aspect include corresponding systems, apparatus, and computer programs recorded on computer storage devices, each configured to perform the operations of the methods.

These and other embodiments can each optionally include one or more of the following features. Identifying an entity name and one or more context terms from the query comprises identifying an entity name in the query and identifying the one or more context terms from remaining terms in the query. Generating a plurality of candidate names for the entity name comprises generating a name query from the entity name and the one or more context terms and searching context-entity name data for candidate names responsive to the name query. The context-entity name data is an index that associates each of a plurality of context terms with a respective list of entity names. The name query specifies that each matching candidate name must match at least one term in the entity name and be associated with at least one of the context terms. The entity name includes one or more parts and the name query further includes a canonical form of each of the name parts of the entity name. The entity name includes one or more parts and the name query further includes one or more related names for one of the one or more parts of the entity name. The name query further includes one or more synonyms for one of the one or more context terms.

Determining a score for each of the candidate names comprises using a respective context consistency measure for the candidate name and each of the context terms and a popularity measurement for the candidate name. Determining the score further comprises using an estimate of a mistyping probability for the entity name and the candidate name.

Using the selected one or more candidate names to generate a response to the query comprises generating a spell corrected query by replacing the entity name in the received query with the top scoring candidate name; and submitting the spell corrected query to a search engine. Using the selected one or more candidate names to generate a response to the query comprises generating a spell corrected query by replacing the entity name in the received query with the top scoring candidate name; and presenting the spell corrected query and a user selectable control that, when selected, causes the spell corrected query to be submitted to a search engine. Using the selected one or more candidate names to generate a response to the query comprises presenting the selected candidate name and a user selectable control for each selected candidate name, wherein the user selectable control for each selected candidate name, when selected, causes the spell corrected query to be submitted to a search engine. Using the selected one or more candidate names to generate a response to the query comprises generating a respective spell corrected query for each selected candidate name; submitting the respective spell corrected query for each selected candidate name to a search engine and receiving search results for each respective spell corrected query from the search engine; and presenting each selected candidate name and the received search results for the respective spell corrected query for the candidate name.

Particular embodiments of the subject matter described in this specification can be implemented so as to realize one or more of the following advantages. Misspelled entity names in user queries can be corrected. Correct spellings of entity names can be determined from the additional context provided by additional terms in user queries. Correct spelling of entity names can be determined from additional terms in a user's search history. Users can quickly identify relevant search results for the entity they intended to seek information about, rather than the entity name they typed. Users can be presented with options for correcting entity names in their queries, and if a user chooses to correct an entity name, the user is presented with search results relevant to the corrected entity name.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
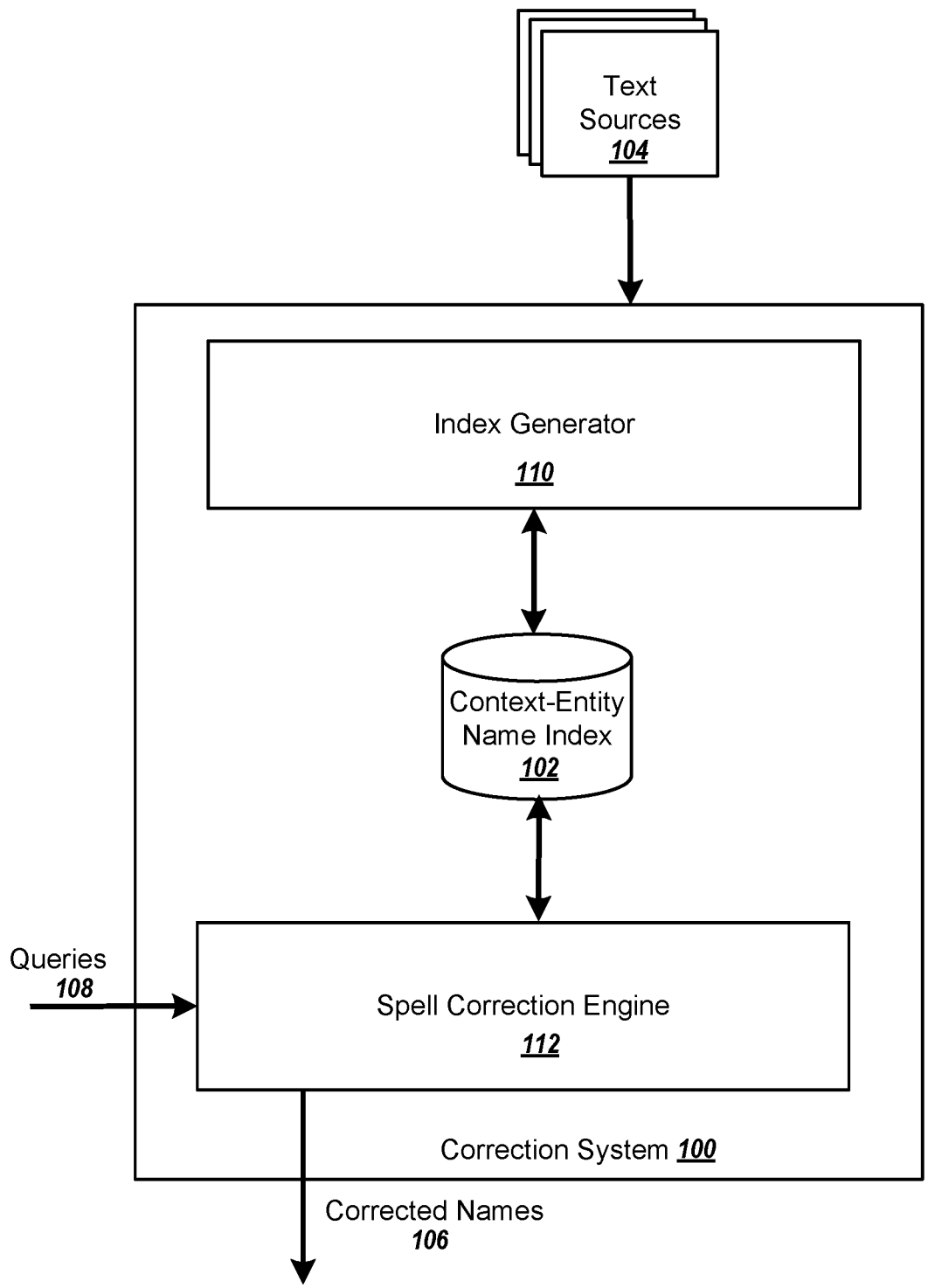
FIG. 1 is a block diagram of an example correction system.

FIG. 1 is a block diagram of an example correction system 100. The correction system 100 is implemented by software running on one or more computers. The correction system 100 builds a context-entity name index 102 from text from text sources 104, and uses the context-entity name index 102 to generate corrected names 106 resulting from a correction of the spelling of entity names in received queries 108.

Each text source 104 is a source from which text can be identified. Example text sources include, for example, documents and previous query sessions during which users submitted queries. A document may, but need not, correspond to a file. A document may be stored in a portion of a file that holds other documents, in a single file dedicated to the document in question, or in multiple coordinated files. The documents can be, for example, the web documents indexed by a search engine, some portion of the web documents indexed by a search engine, e-mail messages, yellow-page listings, news articles, or other documents. Each document can be a separate text source.

A query is a search query submitted by a user to a search engine, for example, through a search engine user interface. The query has one or more terms. A user can submit multiple queries during a user session. A user session is a period of time during which a user submits queries to a search engine. A session can be measured by a period of time (e.g., ten minutes) a number of queries (e.g., the last ten queries submitted), or by periods of inactivity (e.g., the time between two periods of time when a user stopped submitting queries for at least ten minutes). Each query session can be a separate text source. The system can receive the queries for example, from one or more query logs that list previous queries submitted by users. The query logs are preferably anonymized to protect user privacy. The query logs generally identify the text of the queries and identify which queries were submitted by the same user. The query logs can optionally include additional information including, for example, the time at which each query was submitted.

The correction system 100 includes an index generator 110 and a spell correction engine 112. The index generator 110 processes the text from the text sources 104 to generate the context-entity name index 102. An example process for generating the context-entity name index is described in more detail below with reference to FIG. 2. While FIG. 2 illustrates an index used to store context-entity name data, other representations of data associating contexts with entity names, for example, a database or a list, can also be used.

The spell correction engine 112 receives queries 108 and uses the data in the context-entity name index 102 to correct the spelling of entity names in the queries 108. An example process for correcting the spelling of entity names is described in more detail below with reference to FIG. 3. One or more of the resulting corrected names 106 can be presented to a user or used as part of a query to a search engine, as described in more detail below with reference to FIG. 3.

Figure 2:
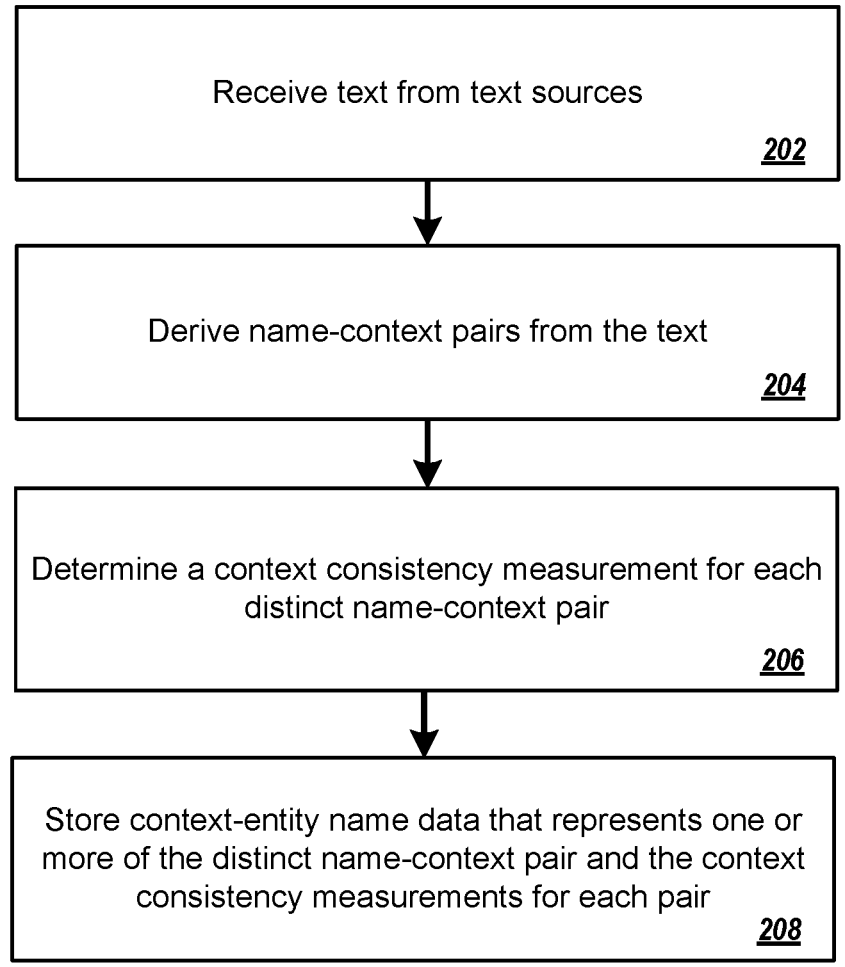
FIG. 2 is a flow diagram of an example process for generating context-entity name data.

FIG. 2 is a flow diagram of an example process 200 for generating context-entity name data. For convenience, the process 200 will be described in reference to a system of one or more computers that performs the process 200. The system can be, for example, the correction system 100 described above with reference to FIG. 1.

The system receives texts from text sources (202). Example text sources include documents and query sessions, as described above with reference to FIG. 1. The system derives name-context pairs from the texts (204). Each name-context pair includes an entity name included in text from one of the text sources and a context term occurring in the text from the text source. Each entity name is one or more terms used to refer to a respective entity and each context term is a term that appears in text associated with the entity name. The text can be associated with the entity name according to one or more rules for defining a window of text, as will be described in more detail below.

Multiple name-context pairs can be derived from text from the same text source and for the same entity name. For example, if a document includes the text: "My favorite doctor, Joe Smith, is in New York," the system can identify the following name-context pairs for the entity name "Joe Smith": ("Joe Smith," "my"), (Joe Smith," "favorite"), ("Joe Smith," "doctor"), ("Joe Smith," "is"), ("Joe Smith," "in"), ("Joe Smith," "New York").

Each context term in a name-context pair provides information on the context in which the entity name in the name-context pair is used in text. In some implementations, each context term for an entity name is a term in a window of text that surrounds, or is otherwise associated with, the entity name. The window of text can be defined according to one or more specified rules. For example, the window of text can be a specified number of words that occur before and after the entity name in the text. As another example, the window of text can include either a specified number of terms on either side of the entity name, or all terms on either side of the entity name until a paragraph or sentence break, whichever results in fewer terms.

Other text can also be included in the window of text for an entity name. For example, when the entity name is extracted from a document, the window of text can alternatively or additionally include text in the title of the document or anchor text in any anchors of the document. An anchor is a link to another document. As another example, the text can include anchor text in anchors that link to the document. Even though the anchor text is not included in the document itself, it is still related to the document by the anchor.

As another example, when the entity name is extracted from a document, the window of text can be defined according to a template for particular types of documents, or particular domains of documents. For example, all documents from a particular domain (e.g., http://www.example.com) might have a similar layout. If so, the system can use a pre-defined template corresponding to the domain of the document to identify the window of text.

As another example, when the entity name is extracted from a query submitted by a user, the window of text can include the text of the query. The window can also include the text of other queries previously submitted by the same user during the same user session.

For example, the window can include the text of all of the most recent queries from a user session that are similar to the query for which the candidate name is being generated. The most recent queries can be defined, for example, in terms of a number of queries or an amount of time. For example, the most recent queries can be the ten previous queries submitted by the user or all queries submitted by the user during the past five minutes. Two queries can be determined to be similar, for example, when they contain terms that are similar. Terms can be considered similar when they are within a threshold distance of each other. For example, two terms can be considered similar when their edit distance, or their bucket distance, is less than a threshold. Edit distance and bucket distance are described in more detail below. As another example, two terms can be considered similar when they are related names. Related names are described in more detail below.

For example, if the specified number of queries is three, and a user entered the queries "doctor bob jones sparta," "william jonas mercy hospital," and "will jones sparta wi" before entering a query including the entity name "bill jones," the window for the entity name "bill jones" will include "doctor bob jones sparta," "william jonas mercy hospital," and "will jones sparta wi."

As another example, the system can include all of the most recent queries submitted by the user without regard to whether the queries are similar to the query in which the entity name was identified.

The system derives the name-context pairs by identifying text from the text source as an entity name, and identifying text in the window of text for the entity name as a context term. The system can identify the entity name using a name detector. An example name detector is a classifier that receives text as input and outputs data indicating whether the text is a first name, a last name, or both a first name and a last name. The name detector can be trained on data specifying known first names, known last names, and terms that are neither first names nor last names, for example, using conventional machine learning techniques. Examples of data used to train the name detector include census data and business directories. The name detector can also be trained to detect middle names and salutations (e.g., Dr., Mrs., Mr.).

The system evaluates the text from each text source using the name detector. When an entity name is detected in text from a given text source, the system then identifies one or more context terms for the entity name from the window of text associated with the entity name.

In some implementations, the system identifies each separate word in the window of text associated with the entity name as a separate term. In other implementations, the system identifies at least some compound words as terms. For example, if a sentence in a document reads "Joe Smith New York," the system can identify "New York" as a single term. The system can identify the compounds using various techniques. For example, in some implementations, the system uses a list of previously identified compounds.

Alternatively, the system can determine how often individual words and groups of words appear in texts (e.g., the document texts or query texts). These counts can then be used to determine, for any given text, which words are most likely individual words and which words are part of a compound. In some implementations, the system uses a dynamic programming algorithm that considers each word in a given text in turn. The dynamic programming algorithm labels words as individual words or as parts of a compound in order to maximize the probability that the particular sequence of words and compounds would be seen in the observed order. The probability is determined according to the individual word counts and group of word counts. Example techniques for identifying compounds are described in more detail in U.S. Pat. No. 7,231,393, entitled "Method and Apparatus for Learning a Probabilistic Generative Model for Text," filed Feb. 26, 2004, which is incorporated herein by reference.

Other techniques for identifying the entity name can also be used. For example, the system can compare each term and n-gram in the text to a database of known names. An n-gram is one or more words that appear in sequence in text.

The system determines a context consistency measure for each distinct name-context pair (206). In general, the context consistency measure P(c|e) estimates the probability that the context term c will appear in text given that the entity name e is in the text. Examples of text include a document or a query.

In some implementations, P(c|e) is derived using the following formula:

$$P(c \mid e) = \frac{\text{number of times } c \text{ appears in windows for } e}{\text{total number of terms in windows for } e}.$$

However, other estimates of P(c|e) can also be used; for example, P(c|e) can be calculated by dividing the number of unique documents from which the name-context pair (e, c) was derived by the total number of documents (or number of texts from other types of text sources) for which a name-context pair for the entity e were derived. As another example, P(c|e) can be calculated by dividing the total number of windows of the entity name e that contain the context term c by the total number of windows of the entity name e. As yet another example, P(c|e) can be calculated by determining, for each document (or number of texts from other types of text sources) in which entity name e was identified, a percentage of the windows fore that contain the context term c and then calculating the average percentage across the documents (or text from other types of text sources).

In some implementations, the system also derives other measurements for the name-context pairs. For example, the system can derive a popularity measurement P(e) for each distinct entity name. The popularity measurement P(e) is an estimate of the probability that an entity name e appears in text and also estimates the probability that a random user intended to search for the entity name e. P(e) can be estimated in various ways. For example, P(e) can be calculated according to the following formula:

$$P(e) = \frac{\text{count}(e)}{\sum_{e_i \in \text{texts}} \text{count}(e_i)},$$

where count(e) is the number of times that the entity e was identified in texts from the text sources used to generate the content-entity name index, and count (e) for all texts is the total number of times that any entity name was identified in the texts from the text sources. Alternatively, the count for a given entity name can be, for example, the number of documents (or texts from other text sources) from which the entity was identified.

Other formulas for calculating P(e) can alternatively be used. For example, P(e) can be the probability that a randomly selected text from a text source will include the entity name e, e.g., the number of texts containing the entity name e divided by the total number of texts considered. As another example, P(e) can be the probability that a user query will include the entity name e, e.g., the number of user queries that include the entity name e divided by the total number of queries users submitted, where the number of queries is derived from query log data.

Other measurements can also be generated.

In some implementations, the system filters the name-context pairs to exclude one or more name-context pairs and does not generate measurements for the excluded name-context pairs. The system can filter the name-context pairs, for example, to remove name-context pairs having a context term that is a stop word, a rare term, or a popular term. The system can determine whether a term is a stop word by comparing the term to a list of stop words. The system can determine whether a term is a rare term or a popular term by comparing the number of times the term appears in the texts from the text sources to a specified rare threshold and a specified popular threshold. If the number is less than the rare threshold, the term is rare. If the number is greater than the popular threshold, the term is popular.

The system stores context-entity name data that represents one or more of the distinct name-context pairs and the context consistency measures for each pair (208). The context-entity name data is searchable data. In some implementations, the context-entity name data is stored in a context-entity name index, for example, the context-entity name index 102 described above with reference to FIG. 1. This index maps each context term to one or more entity names associated with the context term in name-context pairs, and the context consistency measure for each name-context pair. The index can be built, for example, using conventional index building techniques. Other representations of the context-entity name data, for example, a database, can alternatively be used.

Consider an example where there are three name-context pairs for the context "doctor": ("Joe Smith," "doctor"), ("Sue Jones," "doctor"), and ("Bob Green," "doctor"), and where ("Joe Smith," "doctor") has a context consistency measure of 0.4, ("Sue Jones," "doctor") has a context consistency measure of 0.5, and ("Bob Green," "doctor") has a context consistency measure of 0.1. In this example, the context-entity name data could include an entry: "doctor"→{("Joe Smith," 0.4), ("Sue Jones," 0.5), ("Bob Green," 0.1)}. Other formats for the context-entity name data can also be used. For example, the data can be keyed by entity rather than context. As another example, each name-context pair can be stored separately in the data.

In implementations where additional measurements are derived, for example, the popularity measurement for each entity name, the context-entity name data can further include the additional measurements.

In some implementations, the system augments the data for each context term so that each entity name is further associated with a canonical form of each of the parts of the entity name. If one or more of the canonical forms of the name parts are matched during a search of the index, the original form of the name parts are returned.

In some implementations, the system augments the data for each context term with names that are related to the entity names associated with the context term. Two names are related if one is a nickname for the other. For example, "Joe" is a nickname for "Joseph." Therefore, the system could augment the data described above for "doctor" so that "Joseph Smith" is further associated with "Joe Smith". If one or more of the related names is matched during a search of the data, the original name in the data ("Joe Smith" in the current example) is returned as a result of the search.

In some implementations, the system determines the related names for a given name by looking the given name up in a database that associates names with their related names. The database can be generated in advance by the system or another system. For example, the database can be generated from an analysis of query log data. In particular, sequences of queries can be analyzed for a collection of users. For example, if users regularly submit a query that includes a first name, and then refine their query to include a second name, the first name and the second name can be determined to be related.

In some implementations, the database is generated by scoring pairs of names that appear in query refinements. In some implementations, the scores for any two names are asymmetrical, e.g., the score that indicates whether Joe is similar to Joseph can be different from the score that indicates whether Joseph is similar to Joe. Scoring pairs of names can include, for example, dividing the number of times users submit a query including a first name followed by a query including the second name by the number of times users submit a query including the first name (or the number of times users submit a query including the second name). If the score satisfies, e.g., exceeds, a threshold, the system identifies the first name and the second name as related names. In other implementations, the same score is used for both of the names in the pair.

In some implementations, the system filters the context-entity name data and excludes some of the name-context pairs from the context-entity name data. For example, the system can exclude context terms that are stop words, popular terms, or rare terms, as described in more detail above. As another example, the system can exclude name-context pairs for entity names that are popular terms or rare terms.

The system can also calculate a score for each name-context pair and exclude name-context pairs that have a score less than a cutoff threshold from the context-entity name data. The cutoff threshold can be a specified number or can be derived from the scores for the name-context pairs. For example, the cutoff threshold can be selected so as to filter out the bottom ten percent of the name-context pairs.

In some implementations, the score for a given name-context pair is derived from a measure of how frequently the context term of the given name-context pair appears with the entity name of the name-context pair and a measure of how frequently the context term of the name-context pair appears with all entity names in the data, on average.

For example, in some implementations, the score is derived using the following formula:

$$\text{score}(e, c) = \log\left(\frac{P(c \mid e)}{P(c \mid e_0)}\right) \times P(c \mid e),$$

where $P(c \mid e)$ is the context consistency measure for context term c and entity name e, calculated as described above, and $P(c \mid e_0)$ is the average context consistency measure for the context and all entity names identified from the documents In some implementations, $P(c \mid e_0)$ is derived using the following formula:

$$P(c \mid e_0) = \frac{\sum_{e_i \in E} P(c \mid e_i) W_i}{\sum_i W_i},$$

where E is the set of all entity names extracted from the documents, and $W_i$ is an optional weight derived from the frequency with which the entity name i was identified in the texts from the text sources. For example, the weight $W_i$ can be the number of times the entity name i was identified in the documents or the log of the number of times the entity name i was identified in the document. In some implementations, the weight $W_i$ is 1 for all i.

In some implementations, the score for an entity name and context term is further derived from a number of times the entity name and context term appear together in user queries. The system can analyze log data to determine these numbers. The system then uses the number of times the entity name and the context term appear together in user queries to determine the score.

For example, P(c e) can be calculated according to the following formula:

$$P(c|e) = \max \begin{pmatrix} \frac{\text{number of times } c \text{ appears in windows for } e}{\text{total number of terms in windows for } e} \\ \frac{\text{number of queries in which both } c \text{ and } e \text{ appear in a query}}{\text{number of queries in which } e \text{ appears}} \end{pmatrix}.$$

As another example, the scoring formula can further reflect a weight for the entity name and context term $W_{e,c}$, e.g.:

$$\text{score}(e, c) = \log\left(\frac{P(c|e)}{P(c|e_0)}\right) \times P(c|e) \times W_{e,c},$$

where $W_{e,c}$ is derived from the number of times the entity name e and context term c appear together in queries and the number of times the context term c appears in a window for the entity name e. For example, $W_{e,c}$ can be generated by dividing the number of times the entity name e and context term c appear together in queries by the number of times the context term c appears in a window for the entity name e.

In some implementations, the system modifies the scores for a name-context pair extracted from multiple documents to reflect a similarity of the documents (or texts from other text sources) from which the name-context pair was extracted, or the similarity of the windows for the name-context pair. Sometimes, the same content is repeated on multiple web sites because, for example, the content is spam, the content is boilerplate, or the content is output from a database that is replicated in multiple places. Name-context pairs that are derived from frequently duplicated content can have an artificially high score, because the score will reflect each separate replication of the content. Therefore, the system can modify the scores so that name-context pairs that are primarily identified from similar content have a lower score than the pairs would otherwise have.

In some implementations, the system determines how often a name-context pair is extracted from similar content by determining a fingerprint bucket for each separate identification of a context-entity pair. The fingerprint bucket can be generated, for example, by hashing the text in the window for the entity name, hashing the uniform resource locator for the document from which the entity name and context term were identified, or hashing a portion of the uniform resource locator (e.g., the domain). The hash function maps text to one of a specified number of buckets, e.g., twenty buckets.

The system then analyzes the distribution of the fingerprint buckets generated for each distinct name-context pair, and, if the distribution is skewed, e.g., from a normal distribution, discounts the score. For example, if more than a threshold percentage of the identifications are in the same bucket, the system can discount the score, e.g., by multiplying the score by a discount factor.

As another example, the system can cap the score according to one or more specified rules. For example, the rules could state that the number of instances that fall into a top percentage of the buckets should not have more than a specified percentage of the number of instances that fall into the rest of the buckets. If so, the counts are discounted so that the count of the instances is capped at one plus the percentage times the number of instances in the bottom percentage of the buckets. Consider an example where the rule states that the top 25% of the buckets should not have more than 50% of the count of the instances in the lower 75% of the buckets. If the top 25% of the buckets have fifty instances and the lower 75% of the buckets have seventy instances, the total count would be 70+min(50%×70, 50)=105, rather than 70+50=120.

Figure 3:
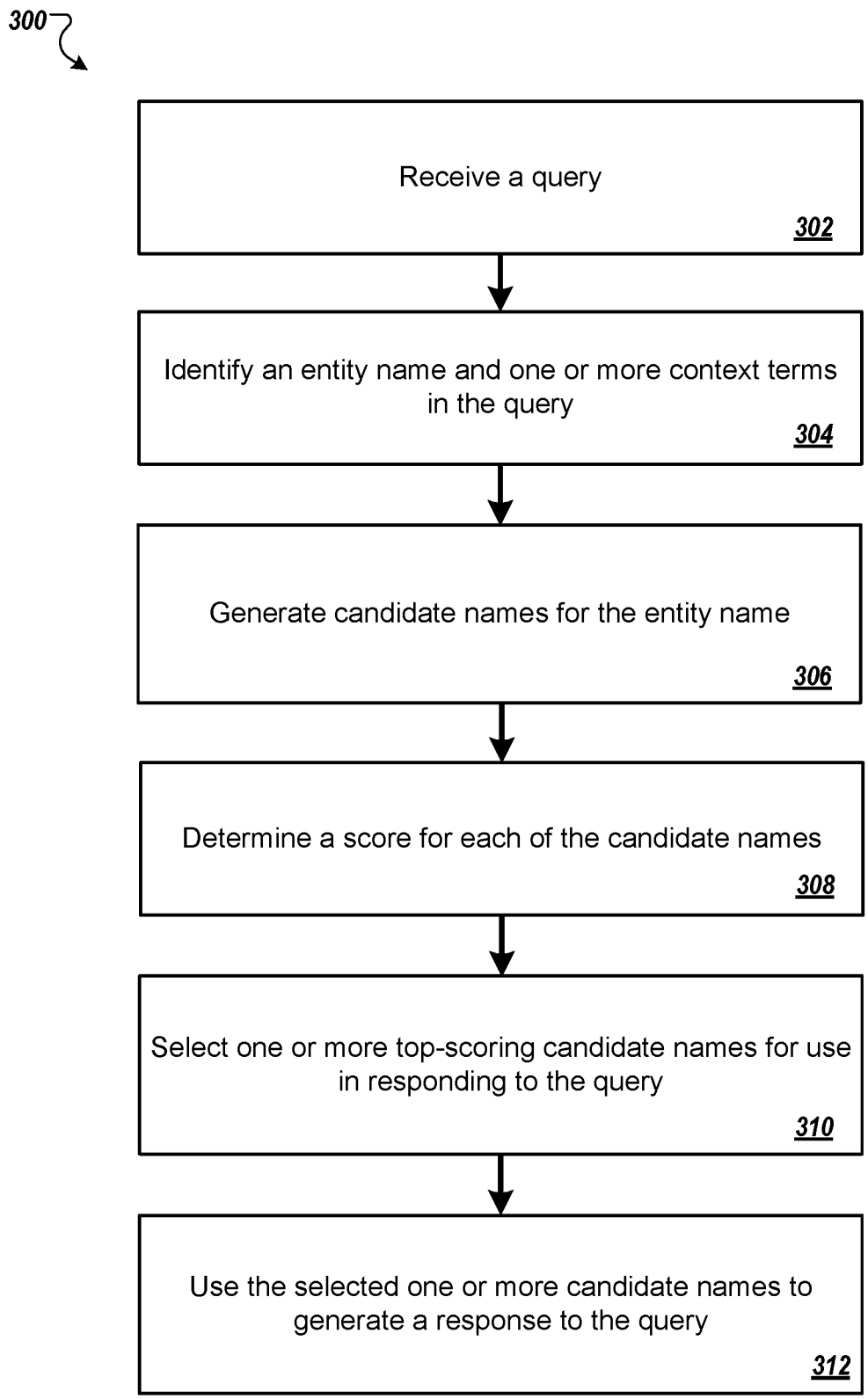
FIG. 3 is a flow diagram of an example process for generating and scoring candidate corrections of an entity name.

FIG. 3 is a flow diagram of an example process 300 for generating and scoring candidate corrections of an entity name. For convenience, the process 300 will be described in reference to a system of one or more computers that performs the process 300. The system can be, for example, the correction system 100 described above with reference to FIG. 1.

The system receives a query (302). For example, the system can receive the query from a search engine user interface.

The system identifies an entity name and one or more context terms in the query (304). In some implementations, the query has two parts, an entity part and a context part. In these implementations, the system identifies the entity part of the query as the entity name and the context part of the query as the context terms. An example user interface in which a user enters a query in two parts is illustrated in FIGS. 4B and 4C.

In other implementations, the query does not have separate parts and the system processes the query to identify the entity name and the one or more context terms. In general, the system identifies the entity name and then identifies remaining terms in the query as context terms. The system can identify the entity name using various techniques.

In some implementations, the system first uses the name detector described above with reference to FIG. 1. If the name detector fails to detect an entity name, the system uses a conventional spell correction algorithm to correct the spelling in the query, and then uses the name detector on the spell-corrected query. If a name is detected in the spell corrected query, the system maps the name in the spell-corrected query back to the original query and identifies the word or words in the original query that correspond to the name in the spell-corrected query. In some implementations, the system also stores the spell-corrected name and adds it to a set of candidate names that are generated as described below. If no name is detected in the spell-corrected query, the system determines whether there are two consecutive terms in the spell-corrected query where the first term is a first name, according to the name detector, and the second term is a rare term. The term is a rare term if it appears fewer than a threshold number of times in data. The data can be, for example, a set of documents, e.g., a set of documents indexed by a search engine, or a subset of the documents indexed by a search engine, for example, the documents used to build a context-entity name index. The data can alternatively be query log data.

The system identifies one or more of the remaining terms (e.g., non-entity name terms) in the query as context terms. The context terms can be individual words or compound words, for example, as described above with reference to FIG. 2. In some implementations, the context terms are all of the terms in the query. In other implementations, the system excludes some terms, for example, terms that are stop words, terms that are on a blacklist or terms that are rare terms or popular terms. In some implementations, the stop words are included on the blacklist. Rare and popular terms are described in more detail above with reference to FIG. 2.

In some implementations, after the system identifies the entity name the system determines whether the entity name is popular. The system can determine that the entity name is popular, for example, when the entity name appears more than a threshold number of times in data, for example, a set of documents or queries such as the documents or queries used to generate the context-entity name data. If the entity name is not popular, the system continues by generating candidate names for the entity name, determining a score for each of the candidate names, selecting a number of top-scoring candidate names, and using the selected top-scoring candidate names to respond to the query, as described in more detail below. However, if the entity name is popular, the system stops the process.

In some implementations, if the entity name is not popular, the system further determines a measure of how closely related the entity name is to the context terms.

For example, the system can calculate a relation score $P(c|e)$ for multiple context terms $\{c_1 \ldots c_n\}$ by retrieving the individual probabilities $P(c|e)$ from the context-entity name data for each context term from the context-entity name data and then multiplying the terms, e.g.: $P(c_1|e) \times P(c_2|e) \times \ldots \times P(c_n|e)$. If $P(c|e)$ satisfies, e.g., exceeds, a specified threshold, the entity name is determined to be closely related to the context terms and the system stops the process and does not perform the actions described below.

Consider an example where the query is "joe smith pennsylvania doctor," and where the individual context terms have the following relation scores: P("pennsylvania"|"joe smith")=0.8 and P("doctor" |"joe smith")=0.7. Then P("pennsylvania" and "doctor"|"joe smith")=0.8× 0.7=0.56. If the threshold is 0.50, then the entity name "Joe Smith" and the context terms "pennsylvania" and "doctor" would be determined to be closely related, and the system would take no further actions to generate or score candidate names.

As another example, the system can calculate the relation score P(c e) by dividing the probability of seeing each of the context terms with the entity by the probability of seeing each of the context terms. This can be calculated, for example, according to the following formula:

$$\frac{P(c_1 \mid e) \times P(c_2 \mid e) \times \ldots \times P(c_n \mid e)}{P(c_1) \times P(c_2) \times \ldots \times P(c_n)},$$

where $P(c_i)$ is the popularity score for context term $c_i$ averaged over all entities.

Consider an example where the query is "joe smith pennsylvania dentist," and where the individual context terms have the relation scores given above, and where P("pennsylvania")=0.5 and P("doctor")=0.3. Then, the system would calculate the score by dividing 0.56 by 0.5× 0.3=0.15, resulting in a score of 3.73. If the threshold is 3, then the entity name "Joe Smith" and the context terms "Pennsylvania" and "doctor" would be determined to be closely related, and the system would take no further actions to generate or score candidate names.

The system generates candidate names for the entity name according to the entity name and the one or more context terms (306). Each candidate name is a possible correction of the entity name, e.g., to fix possible spelling errors in the entity name.

In some implementations, the system generates the candidate names according to the entity name and the context terms. For example, the system can search the context-entity name data, e.g., the context-entity name index 102 described with respect to FIG. 1, for example, using conventional techniques. The results of the search are the candidate names.

In some implementations, the system identifies all entity names in the context-entity name data that are associated with one or more of the context terms identified from the query. For example, the system can use the following query for an entity name associated with context terms $(c_1, \ldots, c_n)$: $(c_1$ OR $c_2$ OR $\ldots$ OR $c_n)$.

In other implementations, the system further requires that each candidate name match at least one part of the entity name (e.g., first name or last name) and at least one context term associated with the entity name. For example, the system can use the following query for entity name $e_1$ $e_2$ and context terms $(c_1, \ldots, c_n)$: $(e_1$ OR $e_2)$ AND $(c_1$ OR $c_2$ OR $\ldots$ OR $c_n)$.

In some implementations, rather than using the entity name itself, the system uses a canonical form of the entity name in the query. For example, the system can drop vowels from the entity name.

In some implementations, the system augments the query used to search the context-entity name data. The system can augment the query, for example, to include spell-corrected versions of the context terms or synonyms of the context terms. The system can also include additional terms corresponding to the division of compound context terms. For example, if one of the context terms is "Jacksonville, Florida" the system can include additional context terms "Jacksonville" and "Florida" in the query. The system can also include terms in queries previously submitted by the user during a user session.

For example, the system can select terms from the queries by examining the most recent queries submitted by the user that are similar to the query for which the candidate name is being generated, or all terms in the most recent queries the user submitted. Heuristics for determining the most recent queries and whether two queries are similar are described in more detail above with reference to FIG. 2.

The system can also use terms in documents that were previously selected by the user, for example, during a user session with a search engine. An identification of which documents were selected in response to which queries can be included in query log data analyzed by the system. The system can use the entire text of documents selected by users or can use a summary of the text, for example, a snippet of text generated by the search engine and presented to the user with the search result.

In some implementations, the system augments the query used to search the context-entity name data to include related names for the entity name. For example, if the entity name is "Joe Smith," the system generates a query for ("Joe"

OR "Joseph" OR "Smith") AND any context terms. The system can identify related names for a given entity name, for example, as described above with reference to FIG. 2.

In some implementations, the system does not submit the complete query to the context-entity name data. Instead, the system re-writes the query as a series of pairs of entity name parts and context terms. For example, the query ($e_1$ OR $e_2$) AND ($c_1$ OR $c_2$) becomes ($e_1$ AND $c_1$) OR ($e_2$ AND $c_1$) OR ($e_1$ AND $c_2$) OR ($e_2$ AND $c_2$). The system then evaluates an estimated retrieval cost of each individual name part and context term pair and generates an overall estimated retrieval cost for the query. Generating an overall estimated retrieval cost includes, for example, summing the individual estimated retrieval costs. If the overall estimated retrieval cost exceeds a specified cost threshold, the system drops pairs from the query, starting with the pair with the highest individual estimated retrieval cost, until the overall retrieval cost is less than the specified cost threshold.

The individual retrieval cost for a given name part and context term pair is estimated from the number of times the name part appears in the context-entity name data and the proportion of entity names associated with the context term in the context-entity name data. The retrieval cost can be estimated, for example, by multiplying the proportion of entity names associated with the context term in the context-entity name data by the number of times the name part appears in the context-entity name data. For example, if name part a appears in the context-entity name data ten million times as part of an entity name, and context term b is associated with one percent of the entity names in the context-entity name data, the individual retrieval cost is 1%(10,000,000)=100,000.

In some implementations, once the system retrieves the candidate names from the context-entity name data, the system filters the candidate names to exclude candidate names that are determined to be too different from the entity name. The determination of whether a candidate name is too different from the entity name can be made by calculating a measure of distance between the candidate name and the entity name. If the distance exceeds a difference threshold, the candidate name is determined to be too different from the entity name.

For example, an edit distance or a bucket distance between the candidate name and the entity name can be used. The edit distance between the candidate name and the entity name is the number of changes required to change the candidate name into the entity name. Different heuristics can be used to calculate the edit distance, including, for example, the hamming distance and the Levenshtein distance.

The bucket distance between the candidate name and the entity name is derived from the number of letters that differ between the candidate name and the entity name. The bucket distance can be the number of letters that differ or a quantity derived from the number of letters that differ, for example, the number of letters that differ divided by the length of the longer of the candidate name and the entity name. In some implementations, the bucket distance is calculated for just the consonants in the two names. In other implementations, the bucket distance is calculated for both consonants and vowels. In still other implementations, each occurrence of one or more vowels is treated as a single vowel placeholder, and the bucket distance is calculated for consonants and vowel placeholders. In some implementations, the system calculates the bucket distance without vowels and the bucket distance with the vowel placeholders and uses the greater distance as the distance between the candidate name and the entity name.

In other implementations, rather than searching a context-entity name data, the system generates the candidate names by mutating the entity name, for example, by adding letters and changing letters. The system can mutate the entity name according to one or more specified rules.

The system determines a score for each of the candidate names (308). The score for each candidate name is derived from a frequency with which each of the one or more context terms appears in text with the candidate name. In general, the score estimates the probability that a user is interested in a candidate entity name e and a context c given that the user entered entity name e' and the context c. This probability can be written:

$P(e,c|e',c)$, and is proportional to:

$P(e) \times P(c|e) \times P(e',c|e,c)$.

This can be approximated as:

$P(e) \times P(c|e) \times P(e'|e)$.

P(e) is calculated as described above with reference to FIG. 2 and can be retrieved from context-entity name data, generated for example, as described above with reference to FIG. 2. P(c|e) for a single context term is described in more detail above with reference to FIG. 2. In some implementations, P(c|e) for multiple context terms $\{c_1 \ldots c_n\}$ is generated by retrieving the individual probabilities for each context term from the context-entity name data and then multiplying the terms, e.g.:

$P(c_1|e) \times P(c_2|e) \times \ldots \times P(c_n|e)$.

P(e'|e) is an estimate of the probability that a user who typed candidate name e actually meant to type the entity name e'. This mistyping probability can be generated using various techniques. For example, in some implementations, the system (or another system) analyzes query data listing past queries entered by users. The query data is preferably anonymized for user privacy. The system (or a separate system) analyzes the query data to determine how often users correct the spelling in their queries from e to e' in order to determine the probability P(e'|e). In some implementations, P(e'|e) is alternatively or additionally derived from a distance between the two names. The distance can be, for example, an edit distance or a bucket distance, as described above.

In some implementations, the P(e'|e) probabilities are pre-calculated and stored, for example, in a database. In other implementations, the probabilities are calculated as needed by the system.

In some implementations, the system includes the original entity name e' in the set of candidate names. In these implementations, if e' is in the context-entity name data, then e' is scored as described above for the other candidate entities. However, if e' is not in the context-entity name data, then P(e') and P(c|e') have to be calculated using a different technique.

In particular, if e' is not in the context-entity name data, the system calculates P(e') by determining the probability of each name part of entity name e' and then multiplying the individual probabilities. For example, if the entity name e' is "Joe Smith," the system would estimate P("Joe Smith") as P("Joe")×P("Smith"). This calculation assumes that the name parts are independent.

The probability for a given name part $e_p$ can be calculated according to the following formula:

$$P(e_p) = \frac{\text{count}(e_p)}{\text{total count of name parts in all names}},$$

where the count($e_p$) is the count of a name part, which is a measure of how often the name part appears in entity names in the documents used to build the context-entity name data. For example, the count can be the total number of times the name part appears in entity names or the number of documents in which the name part appears in an entity name.

Other formulas for calculating P($e_p$) can alternatively be used. For example, P($e_p$) can be calculated by dividing the number of entity names in the context-entity name data that contain the name part $e_p$ by the total number of entity names in the context-entity name data.

In some implementations, P($e_p$) has a lower limit of one divided by the count of entity names in the documents.

When e' is not in the context-entity name data, P(c|e') is derived from the average P(c|$e_i$) over all entities $e_i$ in the context-entity name data. For example, the following formula can be used:

$$P(c|e') = \frac{\sum_{e_i \in E} P(c|e_i) W_i}{\sum_i W_i},$$

where E is the set of all entity names in the context-entity name data, and $W_i$ is an optional weight derived from the frequency with which the entity name $e_i$ was identified in the documents. For example, the weight $W_i$ can be the number of times the entity name $e_i$ was identified in the documents or the log of the number of times the entity name $e_i$ was identified in the document. In some implementations, the weight $W_i$ is 1 for all i.

The system selects one or more top-scoring candidate names (310). In some implementations, the system selects a single top-scoring candidate name, and in other implementations, the system selects multiple top-scoring candidate names.

The system uses the selected candidate names to generate a response to the query (312). The system can use the selected top-scoring candidate names in various ways.

In some implementations, the system automatically corrects the spelling in the received query by replacing the entity name with the top-scoring candidate name. The system then submits the spell-corrected query to a search engine which identifies and returns search results responsive to the spell-corrected query.

In other implementations, the system generates the spell-corrected query by replacing the entity name with the top-scoring candidate name and presents the spell-corrected query to a user, for example, in a search engine user interface. The presentation of the spell-corrected query includes a user-selectable control that, when selected by the user, causes the spell-corrected query to be submitted to a search engine. An example of this presentation is illustrated in FIG. 4A.

In some implementations, the system presents a list of top-scoring candidate names to the user, for example, in an order determined according to the scores. The presentation of each name includes a user-selectable control that, when selected, causes a spell-corrected query generated using the particular candidate name to be submitted to a search engine. An example of this presentation is illustrated in FIG. 4B.

In some implementations, the system generates a spell-corrected query for each of multiple top-scoring candidate entity names, submits a query for each of spell-corrected queries to a search engine, and presents the top-scoring search results for each query. An example of this presentation is illustrated in FIG. 4C.

Figure 4A:
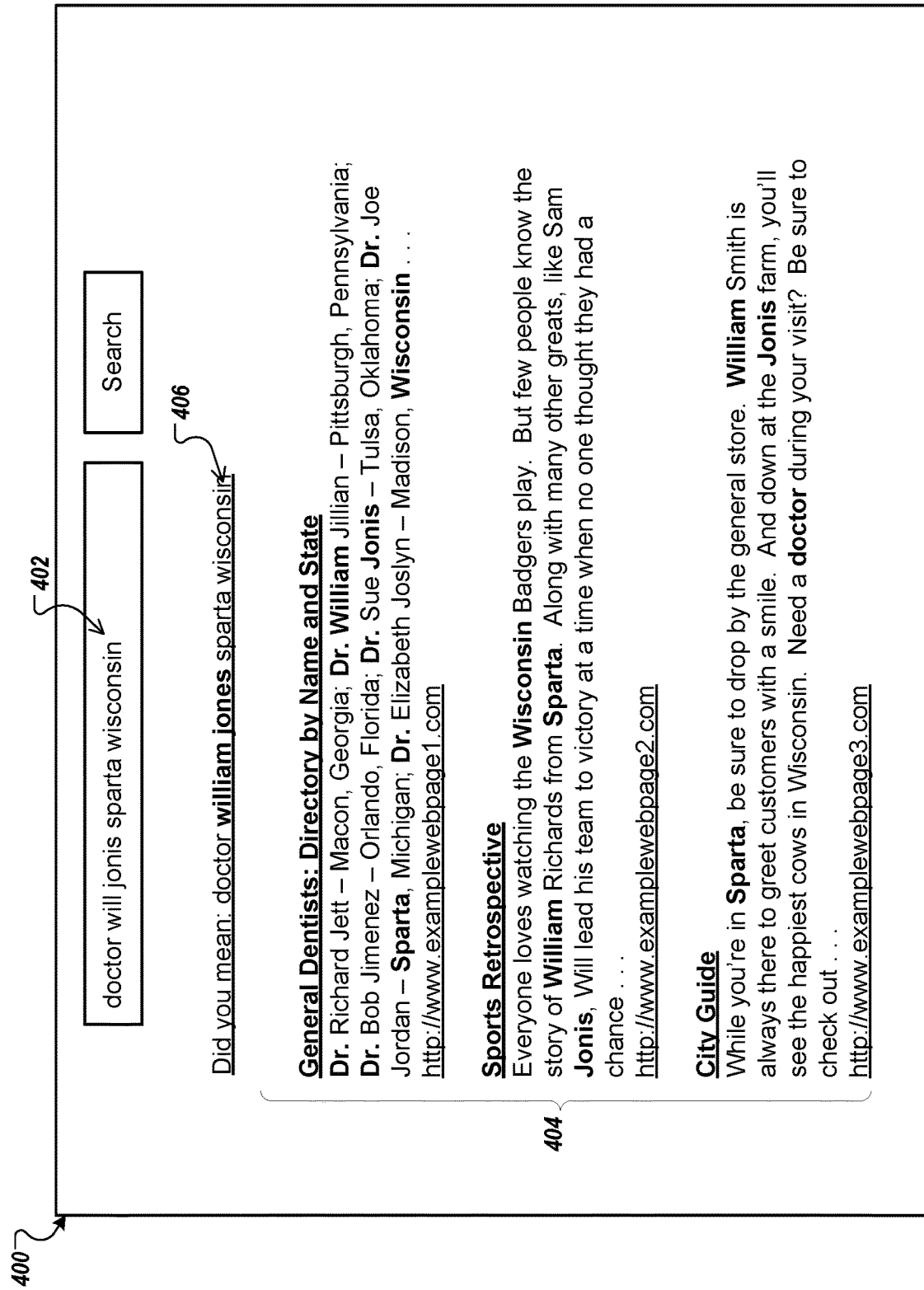
FIGS. 4A-4C illustrate example search user interfaces.
Figure 4B:
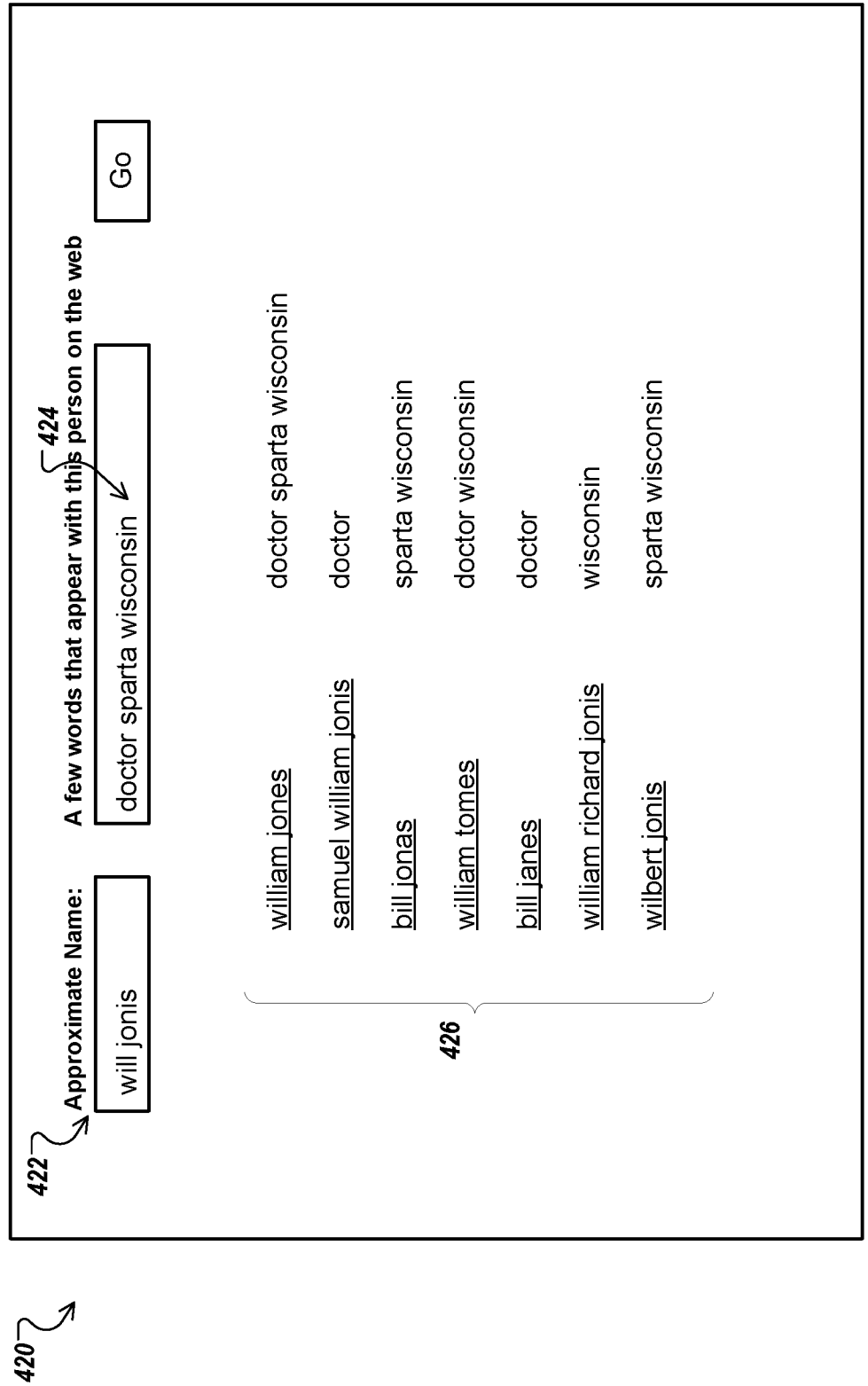
Figure 4C:
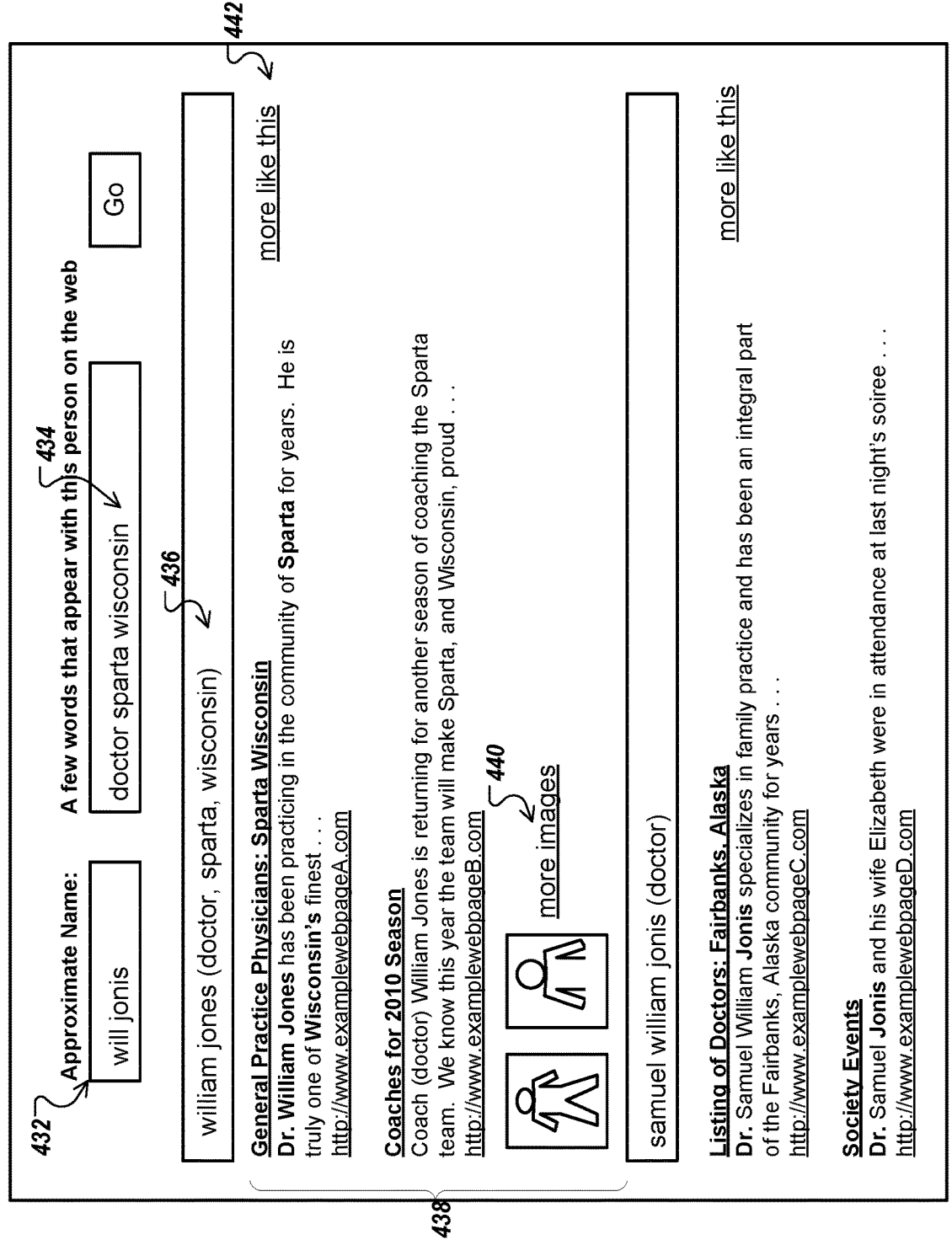

FIGS. 4A-4C illustrate example search user interfaces.

FIG. 4A illustrates an example search user interface 400 where a user has submitted a query 402 for "doctor will jonis sparta wisconsin." The search user interface presents search results 404 responsive to the original query of the user. The search user interface also includes a suggested correction of the query 406 to "doctor william jones sparta wisconsin." This suggested correction includes a user-selectable control (illustrated as a hyperlink) that, when selected by the user, submits a query for the corrected query to a search engine.

FIG. 4B illustrates an example user search interface 420 where a user has submitted a query with two parts. The first part of the query 422 is the name the user is interested in: "will jonis." The second part of the query 424 is the context terms to be used in identifying the correct spelling of the name: "doctor sparta wisconsin."

The user interface presents a list of possible names 426 along with a user selectable control (illustrated as a hyperlink) for each name that, when selected by the user, causes a query for the name and the context terms 424 entered by the user to be submitted to a search engine.

FIG. 4C illustrates an example user search interface 430 presenting search results for each of a top number of candidate names identified from a user's query. The query illustrated in FIG. 4C has two parts: an approximate name of the entity of interest 432 and context terms for the entity of interest 434.

The user interface 430 presents, for each of a top number of names identified from the approximate entity name 432 and the context terms 434, search results responsive to a query for the identified name and the context terms 434 that are associated with the identified name.

The user interface presents, for each identified name, the identified name itself and each context term for which the identified name appears in the context-entity name data. For example, the user interface lists the name "william j ones" and the context terms "(doctor, sparta, wisconsin)" at 436. The user interface presents the top scoring search results 438 retrieved from a search engine for a query corresponding to the name and the context terms, e.g., a query for "william jones and (doctor or sparta or wisconsin)." The search results also include image search results 440 and a selectable control that, when selected, causes additional image search results matching the query to be presented. A user can select the user-selectable "more like this" control 442 to view more search results for the query.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non- volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   providing, by the one or more computers, a search query interface configured to receive a search query;
   receiving, by the one or more computers, a search query, through the search query interface, that requests information about a particular entity, the search query comprising (i) a name portion comprising one or more misspelled words representing an entity name, and (ii) a context portion comprising one or more context words descriptive of the particular entity, wherein the search query is received as a single query string that includes both the name portion and the context portion, and the entity name corresponds to each of a plurality of candidate entities that are potentially responsive to the search query;
   processing, by the one or more computers, the search query to identify the name portion and the context portion;
   based on co-occurrences, in a plurality of documents, of the one or more context words in the context portion of the search query with a particular candidate entity of the plurality of candidate entities, identifying, by the one or more computers, the particular candidate entity as responsive to the request for information about the particular entity, the particular candidate entity corresponding to a corrected spelling of the one or more misspelled words representing the entity name; and
   providing, by the one or more computers, a search results page that includes a first portion of the search results page and a second portion of the search results page, wherein:
      the first portion of the search results page is provided responsive to identifying the particular candidate entity of the plurality of candidate entities as responsive to the request for information about the particular entity;
      the first portion of the search results page identifies the particular candidate entity of the plurality of candidate entities that corresponds to the corrected spelling of the entity name, at least one of the one or more context words, and information related to the particular candidate entity, the information related to the particular candidate entity including (i) a plurality of search results responsive to a query for the particular candidate entity and (ii) an image of the particular candidate entity that are displayed in the first portion of the search results page;
      the second portion of the search results page describes information related to other candidate entities; and
      the first portion of the search results page is visually distinguished from the second portion of the search results page.

2. The method of claim 1, wherein the only candidate entity identified by the search results page in the first portion of the search results page is the particular candidate entity.

3. The method of claim 1, wherein providing, by the one or more computers, the search results page includes an additional portion of the search results page that includes one or more selectable controls that each reference a particular network address that stores information related to the particular candidate entity, wherein selection of a particular selectable control of the one or more selectable controls is configured to trigger display of a subsequent web page that displays information related to the particular candidate entity.

4. The method of claim 1, wherein the search results page includes a first selectable control that corresponds to the first portion of the search results page and a second selectable control that corresponds to the second portion of the search results page,
   wherein the method further comprises:
      receiving a selection of the first selectable control; and
      based on the selection of the first selectable control, providing, by the one or more computers, another search results page that includes additional information related to the particular candidate entity.

5. The method of claim 1,
   wherein the search results page includes a first selectable control that corresponds to the first portion of the search results page and a second selectable control that corresponds to the second portion of the search results page,
   wherein the method further comprises:
      receiving a selection of the second selectable control; and
      based on the selection of the second selectable control, providing, by the one or more computers, another search results page that includes additional information related to one or more of the other candidate entities.

6. The method of claim 1, wherein the search results page further identifies the name portion of the search query separately from the particular candidate entity that is identified in the first portion of the search results page.

7. The method of claim 1, wherein the plurality of documents comprises documents indexed by a search engine.

8. A system comprising:
   one or more computers and one or more storage devices storing instructions that are operable, when executed by the one or more computers, to cause the one or more computers to perform operations comprising:
      providing, by the one or more computers, a search query interface configured to receive a search query;
      receiving, by the one or more computers, a search query, through the search query interface, that requests information about a particular entity, the search query comprising (i) a name portion comprising one or more misspelled words representing an entity name, and (ii) a context portion comprising one or more context words descriptive of the particular entity, wherein the search query is received as a single query string that includes both the name portion and the context portion, and the entity name corresponds to each of a plurality of candidate entities that are potentially responsive to the search query;

processing, by the one or more computers, the search query to identify the name portion and the context portion;

based on co-occurrences, in a plurality of documents, of the one or more context words in the context portion of the search query with a particular candidate entity of the plurality of candidate entities, identifying, by the one or more computers, the particular candidate entity as responsive to the request for information about the particular entity, the particular candidate entity corresponding to a corrected spelling of the one or more misspelled words representing the entity name; and providing, by the one or more computers, a search results page that includes a first portion of the search results page and a second portion of the search results page, wherein:

the first portion of the search results page is provided responsive to identifying the particular candidate entity of the plurality of candidate entities as responsive to the request for information about the particular entity;

the first portion of the search results page identifies the particular candidate entity of the plurality of candidate entities that corresponds to the corrected spelling of the entity name, at least one of the one or more context words, and information related to the particular candidate entity, the information related to the particular candidate entity including (i) a plurality of search results responsive to a query for the particular candidate entity and (ii) an image of the particular candidate entity that are displayed in the first portion of the search results page;

the second portion of the search results page describes information related to other candidate entities; and the first portion of the search results page is visually distinguished from the second portion of the search results page.

9. The system of claim 8, wherein the only candidate entity identified by the search results page in the first portion of the search results page is the particular candidate entity.

10. The system of claim 8, wherein the search results page includes a first selectable control that corresponds to the first portion of the search results page and a second selectable control that corresponds to the second portion of the search results page, wherein the method further comprises:

receiving a selection of the first selectable control; and based on the selection of the first selectable control, providing, by the one or more computers, another search results page that includes additional information related to the particular candidate entity.

11. A non-transitory computer-readable medium storing software comprising instructions executable by one or more computers which, upon such execution, cause the one or more computers to perform operations comprising:

providing, by the one or more computers, a search query interface configured to receive a search query;

receiving, by the one or more computers, a search query, through the search query interface, that requests information about a particular entity, the search query comprising (i) a name portion comprising one or more misspelled words representing an entity name, and (ii) a context portion comprising one or more context words descriptive of the particular entity, wherein the search query is received as a single query string that includes both the name portion and the context portion, and the entity name corresponds to each of a plurality of candidate entities that are potentially responsive to the search query;

processing, by the one or more computers, the search query to identify the name portion and the context portion;

based on co-occurrences, in a plurality of documents, of the one or more context words in the context portion of the search query with a particular candidate entity of the plurality of candidate entities, identifying, by the one or more computers, the particular candidate entity as responsive to the request for information about the particular entity, the particular candidate entity corresponding to a corrected spelling of the one or more misspelled words representing the entity name; and providing, by the one or more computers, a search results page that includes a first portion of the search results page and a second portion of the search results page, wherein:

the first portion of the search results page is provided responsive to identifying the particular candidate entity of the plurality of candidate entities as responsive to the request for information about the particular entity;

the first portion of the search results page identifies the particular candidate entity of the plurality of candidate entities that corresponds to the corrected spelling of the entity name, at least one of the one or more context words, and information related to the particular candidate entity, the information related to the particular candidate entity including (i) a plurality of search results responsive to a query for the particular candidate entity and (ii) an image of the particular candidate entity that are displayed in the first portion of the search results page;

the second portion of the search results page describes information related to other candidate entities; and the first portion of the search results page is visually distinguished from the second portion of the search results page.

12. The computer-readable medium of claim 11, wherein the only candidate entity identified by the search results page in the first portion of the search results page is the particular candidate entity.

13. The computer-readable medium of claim 11, wherein the search results page includes a first selectable control that corresponds to the first portion of the search results page and a second selectable control that corresponds to the second portion of the search results page, wherein the method further comprises:

receiving a selection of the first selectable control; and based on the selection of the first selectable control, providing, by the one or more computers, another search results page that includes additional information related to the particular candidate entity.

\* \* \* \* \*